United States Patent [19]

Minematsu et al.

[11] Patent Number: 5,082,898
[45] Date of Patent: Jan. 21, 1992

[54] POLYPHENYLENE ETHER RESIN COMPOSITION

[75] Inventors: Hiroyuki Minematsu; Yasuo Nagai, both of Niihama, Japan

[73] Assignee: Sumitomo Naugatuck Co., Ltd., Osaka, Japan

[21] Appl. No.: 247,615

[22] Filed: Sep. 22, 1988

[51] Int. Cl.$^5$ .............................................. C08L 71/12
[52] U.S. Cl. ...................................... 525/68; 525/71; 525/905
[58] Field of Search ............................ 525/68, 71, 905

[56] References Cited

U.S. PATENT DOCUMENTS 4,355,126  10/1982  Haaf et al. ............................. 525/68
4,404,321   9/1983  Abolins et al. ...................... 525/905

Primary Examiner—Jacob Ziegler

[57] ABSTRACT

A resin composition comprising:
(A) 10 to 90 parts by weight of a polyphenylene ether resin,
(B) 8 to 88 parts by weight of an ABS resin,
(C) 1 to 30 parts by weight of a first graft copolymer selected from the group consisting of
(C-I) a graft copolymer which is obtainable by polymerizing a monomer mixture comprising an aromatic vinyl compound and at least one other compound copolymerizable therewith in the presence of a polymer (C-1) comprising an unsaturated nitrile compound, an aromatic vinyl compound and at least one other vinyl compound copolymerizable therewith and has a vinyl group at least at one of molecular ends, and
(C-II) a graft copolymer which is obtainable by polymerizing at least one vinyl compound in the presence of a polymer (C-1) and a polymer (C-2) comprising the aromatic vinyl compound and at least one other compound copolymerizable therewith and has a vinyl group at least at one of molecular ends,
(E) 1 to 30 parts by weight of a second graft copolymer which is obtainable by polymerizing a monomer mixture comprising an unsaturated nitrile compound, an aromatic vinyl compound and at least one other vinyl compound copolymerizable therewith in the presence of a polymer which comprises an aromatic vinyl compound and at least one other vinyl compound copolymerizable therewith.

4 Claims, No Drawings

POLYPHENYLENE ETHER RESIN COMPOSITION

BACKGROUND OF THE INVENTION

1. Field of the Invention

The present invention relates to a polyphenylene ether resin composition which has good processability and can provide a molded article with good impact resistance. More particularly, the present invention relates to a polyphenylene ether resin composition which comprises a polyphenylene ether resin, an unsaturated nitrile compound/vinyl aromatic compound/diene rubber resin, one or two kinds of graft copolymers having specific compositions and optionally an aromatic vinyl compound/diene rubber resin and has good processability and can provide a molded article with good impact resistance.

2. Description of the Related Art

Polyphenylene ether resin has good heat and impact resistances, but it is difficult to mold and process said resin alone. Thus, there was proposed a resin composition comprising a polyphenylene ether resin and an aromatic vinyl resin which has improved processability (cf. U.S. Pat. No. 3,383,435).

Although the processability of the polyphenylene ether resin composition is improved, the inherent properties of the polyphenylene ether resin composition such as heat and impact resistances are substantially impaired.

As described in U.S. Pat. No. 3,383,435, known aromatic vinyl resins include polystyrene, rubber-modified polystyrene (HIPS), unsaturated nitrile compound/aromatic vinyl compound/diene rubber resins (ABS resins) and the like. Among the aromatic resins, the ABS resins comprising the unsaturated nitrile compound and the diene rubber have the best impact and solvent resistances.

However, since the ABS resins have poor compatibility with the polyphenylene ether resins, a resin composition of the ABS resin and the polyphenylene ether resin has significantly impaired mechanical properties such as impact resistance although the processability of the composition is improved as in case of the resin composition of polystyrene and the polyphenylene ether resin.

In fact, no resin composition comprising the ABS resin and the polyphenylene ether resin has been practically used although the resin composition comprising the polyphenylene ether resin and polystyrene or HIPS is practically used.

Studies on improvement of the compatibility between the polyphenylene ether resin and the ABS resin have been made and concrete improving techniques are disclosed in U.S. Pat. Nos. 4,360,618 and 4,405,753. In the former U.S. Pat. Nos., the ABS resins are limited to those containing acrylonitrile in low content, namely 2 to 8 % by weight based on the finding that acrylonitrile in the ABS resins is a cause for the poor compatibility. In the latter U.S. patent, the ABS resins are limited to those having a low acrylonitrile content, namely 2 to 15 % by weight, and an ethylenically unsaturated dicarboxylic anhydride/aromatic vinyl compound resin is introduced.

Although the compatibility is improved by lowering the acrylonitrile content in the ABS resins as described in U.S. Pat. Nos. 4,360,618 and 4,405,753, it is impossible to use general ABS resins which contain acrylonitrile in an amount of 20 to 30 % by weight. In addition, the resin composition comprising the ABS resin having the low acrylonitrile content and the polyphenylene ether resin has still unsatisfactory impact resistance.

SUMMARY OF THE INVENTION

One object of the present invention is to provide a polyphenylene ether resin composition having improved processability.

Another object of the present invention is to provide a polyphenylene ether resin which can provide a molded article with improved impact strength.

These and other objects of the present invention are accomplished by a resin composition comprising:

(A) 10 to 90 parts by weight of a polyphenylene ether resin (hereinafter referred to as "PPE"), (B) 8 to 88 parts by weight of a resin comprising (B-1) an unsaturated nitrile compound, (B-2) an aromatic vinyl compound, (B-3) a diene rubber and optionally (B-4) a vinyl compound copolymerizable therewith (hereinafter referred to as "ABS resin"), (C) 1 to 30 parts by weight of a first graft copolymer selected from the group consisting of.

(C-I) a graft copolymer which is obtainable by polymerizing 95 to 5 parts by weight of a monomer mixture comprising 100 to 70 % by weight of (c-v) an aromatic vinyl compound and 0 to 30 % by weight of (c-vi) at least one other compound copolymerizable therewith in the presence of 5 to 95 parts by weight of a polymer (C-1) comprising 10 to 40 % by weight of (c-i) an unsaturated nitrile compound, 60 to 90 % by weight of (c-ii) an aromatic vinyl compound and 0 to 30 % by weight of (c-iii) at least one other vinyl compound copolymerizable therewith and has (c-iv) a vinyl group at least at one of molecular ends, and (C-II) a graft copolymer which is obtainable by polymerizing 4 to 98 % by weight of at least one vinyl compound (c-vii) in the presence of 1 to 95 % by weight of a polymer (C-1) and 1 to 95 % by weight of (C-2) a polymer comprising 50 to 100 % by weight of the aromatic vinyl compound (c-v) and 0 to 50 % by weight of at least one other compound copolymerizable therewith (c-vi) except unsaturated nitrile compounds and has a vinyl group (c-iv) at least at one of molecular ends, (D) 0 to 80 parts by weight of a resin comprising 70 to 100 % by weight of (D-1) an aromatic vinyl compound and 0 to 30 % by weight of (D-2) a diene rubber (hereinafter referred to as "HIPS"), and (E) 1 to 30 parts by weight of a second graft copolymer which is obtainable by polymerizing 95 to 5 parts by weight of a monomer mixture comprising 10 to 40% by weight of (e-iv) an unsaturated nitrile compound, 90 to 60% by weight of (e-v) an aromatic vinyl compound and 0 to 30% by weight of (e-vi) at least one other vinyl compound copolymerizable therewith in the presence of 5 to 95 parts by weight of a polymer (E-1) which comprises 50 to 100 % by weight of (e-i) an aromatic vinyl compound and 0 to 50 % by weight of (e-ii) at least one other vinyl compound copolymerizable therewith except unsaturated nitrile compounds and has a vinyl group (e-iii) at least at one of molecular ends, when (C-I) is present.

DETAILED DESCRIPTION OF THE INVENTION

(A) PPE

A typical example of the PPE resin to be used according to the present invention is a polymer which is obtainable by oxidation polymerization of at least one of monocyclic phenols of the formula:

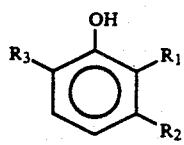 (I)

wherein $R_1$ is a $C_1$-$C_3$ lower alkyl group and $R_2$ and $R_3$ are the same or different and a hydrogen atom or a $C_1$-$C_3$ lower alkyl group in the presence of an oxidation coupling catalyst and oxygen or an oxygen-containing gas.

The PPE may be a homopolymer of the phenol of the formula (I) or a copolymer of two or more of the phenols of the formula (I).

Specific examples of the phenol (I) are 2,6-dimethylphenol, 2,6-diethylphenol, 2,6-dipropylphenol, 2methyl-6-ethylphenol, 2-methyl-6-propylphenol, 2-ethyl-6-propylphenol, m-cresol, 2,3-dimethylphenol, 2,3-diethylphenol, 2,3-dipropylphenol, 2-methyl-3-ethylphenol, 2-methyl-3-propylphenol, 2-ethyl-3-methylphenol, 2-e 2-propyl-3-methylphenol, 2phenol, 2,3,6-trimethylphenol, 2,3,6-triethylphenol, 2,3,6tripropylphenol, 2,6-dimethyl-3-ethylphenol, 2,6-propylphenol and the like.

As the oxidation coupling catalyst to be used in the oxidation polymerization of the phenol (I), any of conventional catalysts may be used. Specific examples of such catalysts are catalysts comprising a cuprous salt and a tertiary amine (e.g. cuprous chloride/triethylamine and cuprous chloride/pyridine), catalysts comprising a cupric salt, an amine and an alkali metal hydroxide (e.g. cupric chloride/pyridine/potassium hydroxide), catalysts comprising a manganese salt and a primary amine (e.g. manganese chloride/ethanolamine, manganese acetate/ethylenediamine), catalysts comprising a manganese salt and an alcoholate or a phenolate (e.g. manganese chloride/sodium methylate, manganese chloride/sodium phenolate), catalysts comprising a cobalt salt and a tertiary amine.

Examples of the polyphenylene ether prepared by polycondensation of the monocyclic phenol (I) are poly(2,6-dimethyl-1,4-phenylene) ether, poly(2,6-diethyl-1,4-phenylene) ether, poly(2,6-dipropyl-1,4-phenylene) ether, poly(2-methyl-6-ethyl-1,4-phenylene) ether, poly(2-methyl-1,4-phenylene) ether, poly(2-ethyl-6-propyl-1,4-phenylene) ether, 2,6-dimethylphenol/2,3,6-trimethylphenol copolymer, 2,6-dimethylphenol/2,3,6-triethylphenol copolymer, 2,6-di-ethylphenol/2,3,6-trimethylphenol copolymer, 2,6-dipropylphenol phenol/2,3,6-trimethylphenol copolymer and the like. Among them, poly(2,6-dimethyl-1,4-phenylene) ether and the 2,6-dimethylphenol/2,3,6-trimethylphenol copolymer are preferred.

(B) ABS resins

The ABS resins to be used according to the present invention include a resin obtainable by polymerizing the unsaturated nitrile compound and the aromatic vinyl compound in the presence of the diene rubber or a mixture of such resin and a copolymer separately prepared by polymerizing the unsaturated nitrile compound and the aromatic vinyl compound. Further, they include a mixture of the diene rubber (e.g. acrylonitrile/butadiene rubber) and the copolymer of the unsaturated nitrile compound and the aromatic vinyl compound.

The ABS resins can be prepared by any of the conventional polymerization methods such as emulsion polymerization, suspension polymerization, bulk polymerization, solution polymerization and combinations of two or more of them.

Specific examples of the unsaturated nitrile compound (B-1) are acrylonitrile, methacrylonitrile, ethacrylonitrile, fumaronitrile, maleonitrile and mixtures thereof. Among them, acrylonitrile and methacrylonitrile are preferred. Specific examples of the aromatic vinyl compound (B-2) are styrene, p-methylstyrene, α-methylstyrene, α-methyl-p-methylstyrene, chlorostyrene, bromostyrene and mixtures thereof. Among them, styrene, p-methylstyrene and chlorostyrene are preferred. Specific examples of the diene rubber (B-3) are homopolymers of conjugated diene compounds (e.g. butadiene, isoprene and chloroprene), copolymers of the conjugated diene compounds with the unsaturated nitrile compounds or the aromatic vinyl compound, natural rubbers and mixtures thereof. Among them, polybutadiene and butadiene/styrene copolymers are preferred.

Specific examples of the optionally used other vinyl compounds (B-4) are alkyl esters of unsaturated carboxylic acids (e.g. methyl acrylate and methyl methacrylate), unsaturated carboxylic acids (e.g. acrylic acid and methacrylic acid), unsaturated carboxylic anhydrides (e.g. maleic anhydride and itaconic anhydride), maleimide compounds (e.g. maleimide, methylmaleimide and N-phenylmaleimide) and mixtures thereof.

The composition and structure of the ABS resin may be widely varied according to the end use (cf. "ABS resins" published by the Japan Polymer Society, August 31, 1970). According to the present invention, preferably the ABS resin comprises 5 to 40 % by weight of the unsaturated nitrile compound, 25 to 90 % by weight of the aromatic vinyl compound and 5 to 70 % by weight of the diene rubber, and the graft polymer which forms a dispersed phase has a weight average particle size of 0.1 to 1 um and a graft degree of 20 to 150 %.

(C) The first graft copolymer

The first graft copolymer is obtainable by polymerizing 95 to 5 parts by weight of the monomer mixture of 100 to 70 % by weight of the aromatic vinyl compound (c-v) and 0 to 30 % by weight of the other compound copolymerizable therewith in the presence of 5 to 95 parts by weight of the below described polymer (C-1) having the specific composition, or by polymerizing 4 to 98 % by weight of the vinyl compound (c-vii) in the presence of 1 to 95 % by weight of the polymer (C-1) and 1 to 95 % by weight of the below described polymer (C-2) having a specific composition. When the first graft copolymer has a composition outside the above range, the objects of the present invention cannot be achieved.

The first graft copolymer may be prepared by a per se conventional method such as emulsion polymerization, suspension polymerization, bulk polymerization, solution polymerization and combinations thereof.

Specific examples of the aromatic vinyl compound (c-v) are styrene, p-methylstyrene, α-methylstyrene, α-methyl-p-methylstyrene, chlorostyrene, bromostyrene and mixtures thereof. Among them, styrene, p-methylstyrene and chlorostyrene are preferred.

Specific examples of the other copolymerizable compound (c-vi) are unsaturated nitrile compounds (e.g. acrylonitrile and methacrylonitrile), alkyl esters of unsaturated carboxylic acids (e.g. ethyl acrylate and methyl methacrylate), maleimide compounds (e.g. maleimide and N-phenylmaleimide) and mixtures thereof.

Specific examples of the vinyl compound (c-vii) polymerizable with the polymers (C-1) and (C-2) are aromatic vinyl compounds (e.g. styrene, p-methylstyrene, α-methylstyrene, α-methyl-p-methylstyrene, chlorostyrene and bromostyrene), unsaturated nitrile compounds (e.g. acrylonitrile, methacrylonitrile and maleonitrile), alkyl esters of unsaturated carboxylic acids (e.g. ethyl acrylate and methyl methacrylate), unsaturated carboxylic acids (e.g. acrylic acid and methacrylic acid), unsaturated carboxylic anhydrides (e.g. maleic anhydride and itaconic anhydride), maleimide compounds (e.g. maleimide, methylmaleimide and N-phenylmaleimide), diene compounds (e.g. butadiene and isoprene) and mixtures thereof.

The polymer (C-1) is a copolymer comprising 10 to 40 % by weight of the unsaturated nitrile compound (c-i) 60 to 90 % by weight of the aromatic vinyl compound (c-ii) and 0 to 30 % by weight of the other vinyl compound copolymerizable therewith (c-iii) and having a vinyl group at at least one of the molecular ends, and has an ability to polymerize with other compounds.

The polymer (C-1) may have any molecular weight. Its preferred number average molecular weight (converted to a molecular weight of polystyrene measured by GPC) is from 1,000 to 100,000 in view of polymerization performance.

The polymer (C-2) is a copolymer comprising 50 to 100 % by weight of the aromatic vinyl compound (c-v) and 0 to 50 % by weight of the other copolymerizable compound (cvi) except the unsaturated nitrile compounds and having a vinyl group at at least one of the molecular ends.

The polymer (C-2) may have any molecular weight. Its preferred number average molecular weight (converted to a molecular weight of polystyrene measured by GPC) is from 1,000 to 100,000 in view of polymerization performance.

Specific examples of the unsaturated nitrile compound (c-i) constituting the polymer (C-1) are acrylonitrile, methacrylonitrile, ethacrylonitrile, fumaronitrile, maleonitrile and mixtures thereof. Among them, acrylonitrile and methacrylonitrile are preferred.

Specific examples of the aromatic vinyl compound (c-ii) and (c-v) constituting the polymers (C-1) and (C-2) are styrene, p-methylstyrene, α-methylstyrene, α-methyl-p-methylstyrene, chlorostyrene, bromostyrene and mixtures thereof. Among them, styrene, p-methylstyrene and chlorostyrene are preferred.

Specific examples of the other vinyl compound (c-iii) which can be used together with the unsaturated nitrile compound and the aromatic vinyl compound are alkyl esters of unsaturated carboxylic acids (e.g. ethyl acrylate and methyl methacrylate), maleimide compounds (e.g. maleimide and N-phenylmaleimide) and mixtures thereof.

Specific examples of the other compound (vi) except unsaturated nitrile compounds are alkyl esters of unsaturated carboxylic acids (e.g. ethyl acrylate and methyl methacrylate), maleimide compounds (e.g. maleimide and N-phenylmaleimide) and mixtures thereof.

The polymer (C-1) may be prepared by polymerizing the unsaturated nitrile compound (c-i), the aromatic vinyl compound (c-ii) and the other vinyl compound (c-iii) in the presence of a chain transfer agent having a carboxyl group in a molecule to prepare a copolymer having the carboxyl group at the molecular end and then reacting the prepared copolymer with a radically polymerizable compound having a glycidyl group in a molecule to obtain the polymer (C-1) having the vinyl group (c-iv) at least one of the molecular ends.

The polymer (C-2) may be prepared by polymerizing the aromatic vinyl compound (c-v) and the other vinyl compound (c-vi) (except the unsaturated nitrile compounds) in the presence of a chain transfer agent having a carboxyl group in a molecule to prepare a copolymer having the carboxyl group at the molecular end and then reacting the prepared copolymer with a radically polymerizable monomer having a glycidyl group in a molecule to obtain the polymer (C-2) having the vinyl group (c-iv) at at least one of the molecular ends.

Specific examples of a chain transfer agent having a carboxyl group in the molecule to be used in the preparation of the copolymers (C-1) and (C-2) are mercaptans such as mercaptoacetic acid, 3-mercaptopropionic acid, 2-mercaptopropionic acid and mixtures thereof. Specific examples of the radically polymerizable monomer having the glycidyl group in the molecule are glycidyl methacrylate, glycidyl acrylate and mixtures thereof.

(D) HIPS

HIPS to be used according to the present invention is a resin comprising 70 to 100 % by weight of the aromatic vinyl compound (D-1) and 0 to 30 % by weight of the diene rubber (D-2).

Specific examples of the aromatic vinyl compound (D-1) are styrene, p-methylstyrene, α-methylstyrene, α-methyl-p-methylstyrene, chlorostyrene, bromostyrene and mixtures thereof. Among them, styrene, p-methylstyrene and chlorostyrene are preferred.

Specific examples of the diene rubber are homopolymers of conjugated diene compounds such as butadiene, isoprene and chloroprene, copolymers of such conjugated dienes with the unsaturated nitrile compound or the aromatic vinyl compound, natural rubbers and mixtures thereof. Among them, polybutadiene and butadiene/styrene copolymer are preferred.

HIPS may be prepared by a per se conventional polymerization method such as emulsion polymerization, suspension polymerization, bulk polymerization, solution polymerization and combinations thereof.

(E) The second graft copolymer which is used when (C-I) present obtainable by polymerizing 95 to 5 parts by weight of a monomer mixture comprising 10 to 40 % by weight of the unsaturated nitrile compound (e-iv), 90 to 60 % by weight of the aromatic vinyl compound (e-v) and 0 to 30 % by weight of at least one other vinyl compound copolymerizable therewith (e-vi) in the presence of 5 to 95 parts by weight of a polymer (E-1) which has the below described specific composition. When the composition of the second graft copolymer is outside the above ranges, the objects of the present invention are not achieved.

The second graft copolymer may be prepared by a per se conventional method such as emulsion polymerization, suspension polymerization, bulk polymerization, solution polymerization and combinations thereof.

Specific examples of the unsaturated nitrile compound (e-iv) are acrylonitrile, methacrylonitrile, ethacrylonitrile, fumaronitrile, maleonitrile and mixtures thereof. Among them, acrylonitrile and methacrylonitrile are preferred.

Specific examples of the aromatic vinyl compound (e-v) are styrene, p-methylstyrene, α-methylstyrene, α-methyl-p-methylstyrene, chlorostyrene, bromostyrene and mixtures thereof. Among them, styrene, p-methylstyrene and chlorostyrene are preferred.

Specific examples of the other copolymerizable compound (e-vi) are alkyl esters of unsaturated carboxylic acids (e.g. ethyl acrylate and methyl methacrylate), maleimide compounds (e.g. maleimide and N-phenylmaleimide) and mixtures thereof.

The polymer (E-1) is a copolymer comprising 50 to 100% by weight of (e-i) an aromatic vinyl compound and 0 to 50% by weight of (e-ii) at least one other vinyl compound copolymerizable therewith except unsaturated nitrile compounds and having a vinyl group (e-iii) at at least one of molecular ends, and has an ability to copolymerize with other compounds.

The polymer (E-1) may have any molecular weight. Its preferred number average molecular weight (converted to a molecular weight of polystyrene measured by GPC) is from 1,000 to 100,000 in view of polymerization ability.

Specific examples of the aromatic vinyl compound (e-i) constituting the polymer (E-1) are styrene, p-methylstyrene, α-methylstyrene, α-methyl-p-methylstyrene, chlorostyrene, bromostyrene and mixtures thereof. Among them, styrene, p-methylstyrene and chlorostyrene are preferred.

Specific examples of the other copolymerizable vinyl compound (e-ii) except unsaturated nitrile compounds are alkyl esters of unsaturated carboxylic acids (e.g. ethyl acrylate and methyl methacrylate), maleimide compounds (e.g. maleimide and N-phenylmaleimide) and mixtures thereof.

The polymer (E-1) may be prepared by polymerizing the aromatic vinyl compound (e-i) and the other copolymerizable vinyl compound (e-ii) in the presence of a chain transfer agent having a carboxyl group in a molecule to prepare a copolymer having the carboxyl group at the molecular end and then reacting the prepared copolymer with a radically polymerizable compound having a glycidyl group in a molecule to obtain the polymer (E-1) having the vinyl group at at least one of the molecular ends.

Specific examples of the chain transfer agent having the carboxylic group in the molecule to be used in the preparation of the copolymer (E-1) are mercaptans such as mercaptoacetic acid, 3-mercaptopropionic acid, 2-mercaptopropionic acid and mixtures thereof. Specific examples of the radically polymerizable monomer having the glycidyl group in the molecule are glycidyl methacrylate, glycidyl acrylate and mixtures thereof.

The resin composition of the present invention comprises 10 to 90 parts by weight of PPE, 8 to 88 parts by weight of the ABS resin, 1 to 30 parts by weight of a first graft copolymer (C-I) or (C-II), 0 to 80 parts by second graft copolymer (E) when the first graft copolymer is (C-I).

If the resin composition has a composition outside the above range, the compatibility between the resins is not improved so that the impact resistance of the resin composition is not improved.

The resin composition of the present invention may be prepared by a per se conventional apparatus and method. For example, the components are mixed by a high speed mixer such as a tumbling mixer and a Henschel mixer and then kneaded by, for example, an extruder, a Banbury mixer or rolls. During mixing the components of the resin composition of the present invention, conventionally used additives such as an antioxidant, an ultraviolet light absorbing agent, a heat stabilizer, a flame retardant, a plasticizer, a lubricant, an antistatic agent, a dye or pigment and a filler, and other resins may be added.

PREFERRED EMBODIMENTS OF THE INVENTION

The present invention will be illustrated by following Examples, in which "parts" and "%" are by weight unless otherwise indicated.

EXAMPLE S1-7 AND COMPARATIVE EXAMPLES 1-4

Preparation of PPE (A)

In a mixture of 2,6-dimethylphenol, di-n-butylamine, cupric bromide and toluene, oxygen was bubbled at 30° C. to proceed polymerization. After removal of the catalyst and purification, polyphenylene ether having an intrinsic viscosity of 0.50 dl/g (25° C in chloroform) was obtained.)

2) Preparation of the ABS resin (B)

In a reactor compounds shown in Table 1 were charged and polymerized in a nitrogen atmosphere at 60° C for 7 hours. The resulting polymer latex was salted out with potassium chloride and dried to obtain Polymer (1) having a graft degree of 70 % and an average particle size of 0.42 um which is hereinafter referred to as "ABS-1".

Polymer (2) having a graft degree of 40 % and an average particle size of 0.42 um (40 parts) was mixed with an acrylonitrile/styrene copolymer (60 parts) which was separately prepared by polymerizing 25 % of acrylonitrile and 75 % of styrene and had an intrinsic viscosity of 0.6 (30° C. in chloroform) and ethylenebisstearylamide (1 part) and the mixture was kneaded by a Banbury mixer to produce particles, which is referred to as "ABS-2".

TABLE 1

|  | ABS-1 | ABS-2 |
|---|---|---|
| Polybutadiene latex*[(1)] (average particle size of 0.4 μm) | 20 | 50 |
| Styrene | 56 | 35 |
| Acrylonitrile | 24 | 15 |
| tert.-Dodecylmercaptan | 0.4 | 0.2 |
| Potassium persulfate | 0.5 | 0.5 |
| Disproportionated potassium rosinate | 2 | 2 |
| Ion exchanged water | 150 | 150 |

Note:
*[(1)]Solid content.

3) Preparation of the first graft copolymers C-I (1, (2) and (3)

In a reactor, acrylonitrile (28 parts), styrene (72 parts), azobisisobutyronitrile (1.2 parts), 2-mercaptopropionic propionic acid (2.1 parts) and butyl acetate (55 parts) were charged and polymerized in a nitrogen atmosphere at 90° C. for 6 hours. Thereafter, glycidyl methacrylate (2.7 parts), tetrabutylammonium bromide (0.8 part) and hydroquinone monoethyl ether (0.1 part) were further charged and reacted while bubbling the air at 90° C. for 10 hours.

The reaction mixture was precipitated in 10 time volume of methanol, filtered and dried to obtain a polymer (C-1) having a number average molecular weight of 10,000 (converted to a molecular weight of polystyrene measured by GPC).

The obtained polymer (C-1), styrene, azobisisobutyronitrile and toluene in amounts (parts) shown in Table 2 were charged in a reactor and polymerized at 70° C for 24 hours to obtain the graft copolymer (C-I).

TABLE 2

| Graft copolymer (C-I) | (1) | (2) | (3) |
|---|---|---|---|
| Polymer (C-1) | 10 | 50 | 90 |
| Styrene | 90 | 50 | 10 |
| Azobisisobutyronitrile | 2 | 2 | 2 |
| Toluene | 100 | 100 | 100 |

70° C. for 24 hours to obtain a graft copolymer (E-(1), (2) and (3)).

TABLE 3

| Graft copolymer (E) | (1) | (2) | (3) |
|---|---|---|---|
| Polymer | 10 | 50 | 90 |
| Styrene | 60 | 30 | 8 |
| Acrylonitrile | 30 | 20 | 2 |
| Azobisisobutyronitrile | 2 | 2 | 2 |
| Toluene | 100 | 100 | 100 |

5) HIPS (D)

Rubber-reinforced polystyrene (high impact polystyrene) ("500A" manufactured by Nippon Polystyrene Co., Ltd.) was used as HIPS (D).

PPE, the ABS resins (ABS-1 and ABS-2), the first graft copolymers ( C-I (1), (2) and (3)), the second graft copolymers ((E)-(1), (2) and (3)) and HIPS were compounded in amounts (parts) shown in Table 4, throughly mixed by a Henschel mixer and kneaded and pelletized by an extruder.

From the produced pellets, a sample piece was molded by an injection molding apparatus and its notched Izod impact strength (1/4", at 23° C) was measured. Processability of the pellets was evaluated by a KOKA-type flow tester at 250° C under a pressure of 30 kg/cm2 The results are shown in Table 4.

TABLE 4

| Example No. | 1 | 2 | 3 | 4 | 5 | 6 | 7 | Comp. 1 | Comp. 2 | Comp. 3 | Comp. 4 |
|---|---|---|---|---|---|---|---|---|---|---|---|
| (A) PPE | 75 | 47 | 42 | 9 | 36 | 54 | 27 | 50 | 30 | 42 | 47 |
| (B) ABS resin | | | | | | | | | | | |
| ABS-1 | 8 | 47 | 42 | 81 | — | 27 | 27 | 50 | 30 | 43 | 46 |
| ABS-2 | — | — | — | — | 45 | — | — | — | — | — | — |
| (C-I) | | | | | | | | | | | |
| (1) | — | — | — | — | 5 | — | — | — | — | — | — |
| (2) | 2 | — | — | — | — | — | — | — | — | — | — |
| (3) | — | 4 | 15 | 5 | — | 5 | 5 | — | — | 15 | — |
| (D) HIPS | — | — | — | — | 9 | 9 | 36 | — | 40 | — | — |
| (E) | | | | | | | | | | | |
| (1) | 15 | — | — | — | — | — | — | — | — | — | — |
| (2) | — | 3 | — | 5 | — | — | 5 | — | — | — | 7 |
| (3) | — | — | 1 | — | 5 | 5 | — | — | — | — | — |
| Notched Izod impact strength (kg · cm/cm) | 6.3 | 18.9 | 20.5 | 27.1 | 14.3 | 11.5 | 13.5 | 3.1 | 6.2 | 5.3 | 5.2 |
| Processability ($\times 10^{-3}$ cm$^3$/sec.) | 8 | 28 | 33 | 71 | 35 | 29 | 39 | 2 | 25 | 13 | 15 |

4) Preparation of the second graft copolymers E-(1), E-(2) and E-(3)

In a reactor, styrene (100 parts), azobisisobutyronitrile (1.2 parts), 2-mercaptopropionic acid (2.1 parts) and butyl acetate (55 parts) were charged and polymerized in a nitrogen atmosphere at 90° C for 6 hours. Thereafter, glycidyl methacrylate (2.7 parts), tetrabutylammonium bromide (0.8 part) and hydroquinone monomethyl ether (0.1 part) were further charged and reacted at 90° C for 10 hours while bubbling the air in the mixture.

The reaction mixture was precipitated in 100 time volume of methanol, filtered and dried to obtain a polymer having a number average molecular weight of 4,500 (converted to a molecular weight of polystyrene measured by GPC).

The obtained polymer, styrene, acrylonitrile, azobisisobutyronitrile and toluene in amounts (parts) shown in Table 3 were charged in a reactor and polymerized at

EXAMPLES 8–13 AND COMPARATIVE EXAMPLES 5–8

As PPE, the ABS resin and HIPS, those prepared and used in Examples 1-7 were used.

Preparation of the graft copolymer (C-II)

A) Preparation of the polymer (C-1)

The polymer (C-1) was prepared in the same manner as in Examples 1-7.

B) Preparation of the polymer (C-2)

In a reactor, styrene (100 parts), azobisisobutyronitrile (1.2 parts), 2-mercaptopropionic acid (2.1 parts) and butyl acetate (55 parts) were charged and polymerized in a nitrogen atmosphere at 90° C for 6 hours. Thereafter, glycidyl methacrylate (2.7 parts), tetrabutylammonium bromide (0.8 part) and hydroquinone monoethyl ether (0.1 part) were further charged and reacted while bubbling the air at 90° C for 10 hours.

The reaction mixture was precipitated in 10 time volume of methanol, filtered and dried to obtain a polymer (C-2) having a number average molecular weight of 4,500 (converted to a molecular weight of polystyrene measured by GPC).

C) Graft copolymerization

The obtained polymers (C-1) and (C-2), styrene, acrylonitrile, azobisisobutyronitrile and toluene in amounts (parts) shown in Table 5 were charged in a reactor and polymerized at 70° C for 24 hours to obtain the graft copolymer (C-II) ((1) to (8))

TABLE 5

| Graft copolymer (C-II) | (1) | (2) | (3) | (4) | (5) | (6) | (7) | (8) |
|---|---|---|---|---|---|---|---|---|
| Polymer (C-1) | 5 | 10 | 25 | 40 | 50 | 5 | 90 | — |
| Polymer (C-2) | 5 | 40 | 25 | 10 | 40 | 65 | — | 50 |
| Styrene | 90 | 50 | 30 | 30 | 10 | 20 | 10 | 30 |
| Acrylonitrile | — | — | 20 | 20 | — | 10 | — | 20 |
| Azobisisobutyronitrile | 2 | 2 | 2 | 2 | 2 | 2 | 2 | 2 |
| Toluene | 100 | 100 | 100 | 100 | 100 | 100 | 100 | 100 |

PPE, the ABS resins (ABS-1 and ABS-2), the graft copolymers ( C-II (1)-(8)) and HIPS were compounded in amounts (parts) shown in Table 6, throughly mixed by a Henschel mixer and kneaded and pelletized by an extruder.

From the produced pellets, a sample piece was molded by an injection molding apparatus and its notched Izod impact strength (¼", at 23° C.) was measured. Processability of the pellets was evaluated by a KOKA-type flow tester at 250° C under a pressure of 30 kg/cm2 The results are shown in Table 6.

TABLE 6

| Example No. | 8 | 9 | 10 | 11 | 12 | 13 | Comp. 5 | Comp. 6 | Comp. 7 | Comp. 8 |
|---|---|---|---|---|---|---|---|---|---|---|
| (A) PPE | 70 | 47 | 42 | 10 | 35 | 26 | 50 | 30 | 42 | 47 |
| (B) ABS resin | | | | | | | | | | |
| ABS-1 | 10 | 46 | 43 | 80 | — | 26 | 50 | 30 | 43 | 46 |
| ABS-2 | — | — | — | — | 45 | — | — | — | — | — |
| (C-II) | | | | | | | | | | |
| (1) | — | — | — | — | 10 | — | — | — | — | — |
| (2) | 20 | — | — | — | — | — | — | — | — | — |
| (3) | — | — | — | 10 | — | — | — | — | — | — |
| (4) | — | — | — | — | — | 13 | — | — | — | — |
| (5) | — | — | 15 | — | — | — | — | — | — | — |
| (6) | — | 7 | — | — | — | — | — | — | — | — |
| (7) | — | — | — | — | — | — | — | — | 15 | — |
| (8) | — | — | — | — | — | — | — | — | — | 7 |
| HIPS | — | — | — | — | 10 | 35 | — | 40 | — | — |
| Notched Izod impact strength (kg · cm/cm) | 6.5 | 19.5 | 23.1 | 28.5 | 15.2 | 14.0 | 3.1 | 6.2 | 5.3 | 5.2 |
| Processability (× 10⁻³ cm³/sec.) | 9 | 28 | 35 | 79 | 36 | 39 | 2 | 25 | 13 | 15 |

As apparent from the results of Table 4, the resin compositions comprising PPE, the ABS resin, the first and second graft copolymers and HIPS in specific ratios have superior impact strength and processability to the conventional resin compositions of Comparative Examples.

What is claimed is:

1. A resin composition comprising:

(A) 10 to 90 parts by weight of a polyphenylene ether resin, (B) 8 to 88 parts by weight of a resin comprising (B-1) an unsaturated nitrile compound (B-2) an aromatic vinyl compound, (B-3) a diene rubber and optionally (B-4) a vinyl compound copolymerizable therewith, (C) 1 to 30 parts by weight of a first graft copolymer selected from the group consisting of (C-I) a graft copolymer which is obtainable by polymerizing 95 to 5 parts by weight of a monomer mixture comprising 100 to 70% by weight of (c-v) an aromatic vinyl compound and 0 to 30% by weight of (c-vi) at least one other compound copolymerizable therewith in the presence of 5 to 95 parts by weight of a polymer (C-1) comprising 10 to 40% by weight of (c-i) an unsaturated nitrile compound, 60 to 90% by weight of (c-iii) at an aromatic vinyl compound and 0 to 30% by weight of (c-iii) at least one other vinyl compound copolymerizable therewith, and having (c-iv) a vinyl group at least at one of molecular ends, and (C-II) a graft copolymer which is obtainable by polymerizing 4 to 98% by weight of at least one vinyl compound (c-vii) in the presence of 1 too 95% by weight of a polymer (C-1) comprising 10 to 40% by weight of c-i) an unsaturated nitrile compound, 60 to 90% by weight of (c-ii) an aromatic vinyl compound and 0 to 30% by weight of (c-iii) at least one other vinyl compound copolymerizable therewith, and having (c-iv) a vinyl group at least at one of molecular ends, and 1 to 95% by weight of (C-2) a polymer comprising 50 to 100% by weight of the aromatic vinyl compound (c-v) and 0 to 50% by weight of at least one another compound copolymerizable therewith (c-vi) except unsaturated nitrile compounds, and having (c-iv) a vinyl group at least at one of molecular ends, (E) 1 to 30 parts by weight of a second graft copolymer which is obtainable by polymerizing 95 to 5 parts by weight of a monomer mixture comprising 10 to 40% by weight of (e-iv) an unsaturated nitrile compound, 90 to 60% by weight of (e-v) an aromatic vinyl compound and 0 to 30% by weight of (e-vi) at least one other vinyl compound copolymerizable therewith in the presence of 5 to 95 parts by weight of a polymer (E-1) which comprises 50 to 100% by weight of (e-i) an aromatic vinyl compound and 0 to 50% by weight of (e-ii) at least one other vinyl compound copolymerizable therewith except unsaturated nitrile compounds, and has (e-iii) a vinyl group at least at one of molecular ends, when (C-I) is present.

2. The resin composition according to claim 1, wherein the polyphenylene ether resin is at least one selected from the group consisting of poly(2,6-dimethyl-1,4-phenylene) ether, poly(2,6-diethyl-1,4-phenylene) ether, poly(2,6-dipropyl-1,4-phenylene) ether, poly(2-methyl-6ethyl-1,4-phenylene) ether, poly(2-methyl-6-propyl-1,4-phenylene) ether, poly(2-ethyl-6-propyl-1,4-phenylene) ether, 2,6-dimethylphenol/2,3,6-trimethylphenol copolymer, 2,6-dimethylphenol/2,3,6-triethylphenol copolymer, 2,6-diethylphenol/2,3,6-trimethylphenol copolymer and 2,6-dipropylphenol/2,3,6-trimethylphenol copolymer 3. The resin composition according to claim 2, wherein the polyphenylene ether resin is poly(2,6-dimethyl-1,4-phenylene) ether or the 2,6-dimethylphenol/2,3,6-trimethylphenol copolymer.

4. The resin composition according to claim 1, wherein the resin (B) comprises 5 to 40 % by weight of the unsaturated nitrile compound, 25 to 90 % by weight of the aromatic vinyl compound and 5 to 70 % by weight of the diene rubber.

* * * * *

UNITED STATES PATENT AND TRADEMARK OFFICE
CERTIFICATE OF CORRECTION

PATENT NO. : 5,082,898

DATED : January 21, 1992

INVENTOR(S) : Hiroyuki Minematsu, et al

It is certified that error appears in the above-identified patent and that said Letters Patent is hereby corrected as shown below:

Claim 1 (column 12, lines 18 and 19), change "60 to 90% by weight of (c-iii) at" to --60 to 90% by weight of (c-ii)--.

Claim 1 (column 12, line 26), change "too" to --to--.

Claim 1 (column 12, line 28), change "c-i)" to --(c-i)--.

Claim 3 (column 13, line 14), change "6ethyl" to --6-ethyl--.

Signed and Sealed this

Thirtieth Day of March, 1993

*Attest:*

STEPHEN G. KUNIN

*Attesting Officer*     *Acting Commissioner of Patents and Trademarks*